United States Patent

Ogasawara et al.

(10) Patent No.: US 10,249,865 B2
(45) Date of Patent: Apr. 2, 2019

(54) BUS BAR MODULE

(71) Applicant: YAZAKI CORPORATION, Minato-ku, Tokyo (JP)

(72) Inventors: Shigeyuki Ogasawara, Kakegawa (JP); Shinichi Yanagihara, Kakegawa (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 618 days.

(21) Appl. No.: 14/285,779

(22) Filed: May 23, 2014

(65) Prior Publication Data

US 2014/0349165 A1 Nov. 27, 2014

(30) Foreign Application Priority Data

May 27, 2013 (JP) .................................. 2013-111111

(51) Int. Cl.
*H01M 2/20* (2006.01)
(52) U.S. Cl.
CPC ........ *H01M 2/206* (2013.01); *H01M 2220/20* (2013.01)
(58) Field of Classification Search
CPC .................................. H01M 2/04; H01M 2/06
See application file for complete search history.

(56) References Cited

U.S. PATENT DOCUMENTS

| 2013/0071721 A1* | 3/2013 | Ogasawara | H01M 2/1077 |
| | | | 429/151 |
| 2014/0134884 A1* | 5/2014 | Okamoto | B60L 11/1851 |
| | | | 439/627 |

FOREIGN PATENT DOCUMENTS

| CN | 102044693 A | 5/2011 |
| CN | 102947971 A | 2/2013 |
| JP | 2011-238544 A | 11/2011 |
| JP | 2011238544 A * | 11/2011 |
| JP | 2013016429 A * | 1/2013 |
| WO | 2012/176935 A1 | 12/2012 |

OTHER PUBLICATIONS

Communication dated Dec. 3, 2015 from the State Intellectual Property Office of the P.R.C. in counterpart application No. 201410228394.6.

* cited by examiner

*Primary Examiner* — Barbara L Gilliam
*Assistant Examiner* — Nathanael T Zemui
(74) *Attorney, Agent, or Firm* — Sughrue Mion, PLLC

(57) ABSTRACT

A bus bar module includes: a plurality of bus bar cases each housing a bus bar; a first engagement portion provided to one of the plurality of bus bar cases; a first connecting member having flexibility and connecting the plurality of bus bar cases; a plurality of insulating covers covering openings of the plurality of bus bar cases, the insulating covers including a second engagement portion to be engaged with the first engagement portion; a second connecting member having flexibility and connecting the plurality of insulating covers; and a pair of ribs provided to extend downward from an inner surface of each of the insulating covers located adjacent to each other.

3 Claims, 5 Drawing Sheets

BUS BAR MODULE

BACKGROUND OF THE INVENTION

Field of the Invention

The present invention relates to a bus bar module, or more specifically, to a structure for engagement between resin bus bar cases which house bus bars for connecting multiple battery cells in series and resin covers which cover openings of the bus bar cases.

Background Art

A battery pack (also referred to as an assembled battery or a battery unit) formed by connecting multiple battery cells in series is used as a direct-current power source for driving an electric motor in an electric vehicle, a hybrid car or the like. As described in Japanese Patent Application Publication No. 2011-238544 (Patent Document 1), such a battery pack is fabricated by forming a battery assembly in which positive electrodes and negative electrodes of multiple battery cells alternately arranged side by side are bundled and the positive electrodes and the negative electrodes of the adjacent battery cells are connected in series by using conductive bodies called bus bars, and, if necessary, by housing the battery assembly in a housing. Then, the battery pack is put to use.

The bus bars are respectively housed in box-shaped bus bar housing units (hereinafter referred to as bus bar cases) made of an insulative resin. The bus bar cases are connected in an arrangement direction of the battery cells by using U-shaped flexible connecting members. Then, a bus bar module is formed in such a way that: the columnar positive and negative electrodes of the battery cells are inserted into holes formed in the bus bars, and are fixed thereto with nuts or the like; and the bus bars and the electrode members exposed on an opening side of the bus bar cases are protected by being covered with plate-shaped insulating covers In particular, the insulating covers are formed as multiple separate covers each for a plural number of bus bar cases set appropriately in consideration of a dimensional tolerance of the battery unit. The separate insulating covers are connected to one another using flexible connecting members. Moreover, each insulating cover includes a second engagement portion to be engaged with a first engagement portion provided to a given one of the bus bar cases. The bus bar module is formed by engaging the first and second engagement portions (hereinafter referred to as a lock mechanism as appropriate) with one another.

SUMMARY OF THE INVENTION

However, the bus bar module described in Patent Document 1 does not consider that the engagement of the lock mechanism may be released for some reason in the course of assembling a bus bar module by engaging the corresponding engagement portions of the insulating covers and the bus bar cases with one another. Specifically, there may be a case where the lock mechanism for at least one of two adjacent insulating covers is unlocked and the unlocked insulating cover is displaced relative to the corresponding bus bar case due to a deformation of the connecting member. If the insulating cover is displaced relative to the openings of the bus bar cases as described above, the columnar electrodes and the bus bars are exposed. The exposure of the columnar electrodes and the bus bars, to which a battery voltage is being applied, disturbs attachment work of the bus bar module and should therefore be avoided as much as possible.

An object of the present invention is to provide a bus bar module, which is capable of preventing exposure of a columnar electrode and a bus bar, the exposure being likely to occur due to displacement of an insulating cover relative to a bus bar case in the course of assembling the bus bar module by engaging a lock mechanism for the insulating cover and the bus bar case.

An aspect of the present invention is a plurality of bus bar cases made of a resin, each bus bar case configured to house a bus bar to connect a positive electrode of a battery cell and a negative electrode of an adjacent battery cell among battery cells arrayed such that the positive electrodes and the negative electrodes of the battery cells are arranged alternately; a first engagement portion provided to one of the plurality of bus bar cases; a first connecting member having flexibility and configured to connect the plurality of bus bar cases; a plurality of insulating covers made of a resin, the insulating covers configured to cover openings of the plurality of bus bar cases and including a second engagement portion to be engaged with the first engagement portion; a second connecting member having flexibility and configured to connect the plurality of insulating covers; and a pair of ribs provided to extend downward from an inner surface of each of the insulating covers located adjacent to each other while interposing the second connecting member in between, the pair of ribs configured to be in contact respectively with inner surfaces of paired walls of the corresponding bus bar case, the walls extending in a direction of arrangement of the bus bar cases and facing each other.

Each of the pair of ribs may be provided at a position in the insulating cover close to the second connecting member. Each of the pair of ribs may include a reinforcing rib extending from the inner surface of the insulating cover toward a top portion of the corresponding wall of the bus bar case, and having such a length that the reinforcing rib is out of contact with the top portion.

According to the present invention, it is possible to prevent exposure of the columnar electrode and the bus bar, the exposure being likely to occur due to displacement of the insulating cover relative to the bus bar case in the course of assembling the bus bar module by engaging the lock mechanism for the insulating cover and of the bus bar case.

DESCRIPTION OF EMBODIMENTS

Figure 1:
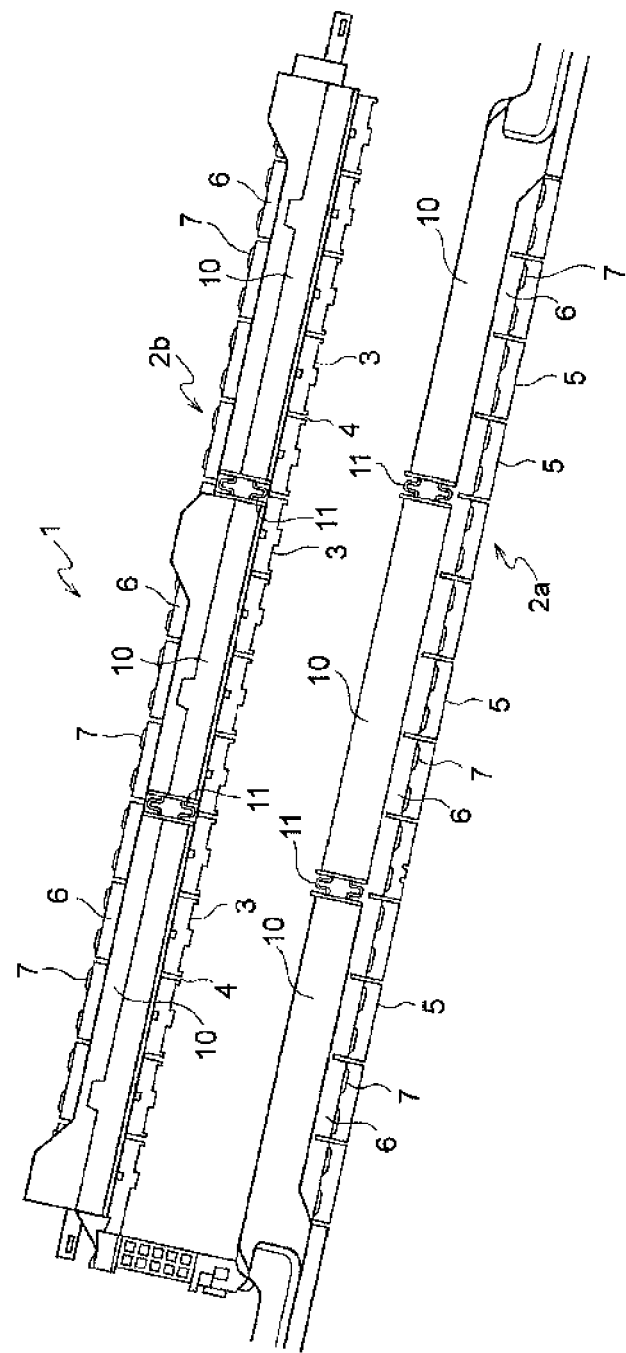
FIG. 1 is a perspective view showing an external appearance of a bus bar module according to an embodiment of the present invention.
Figure 2:
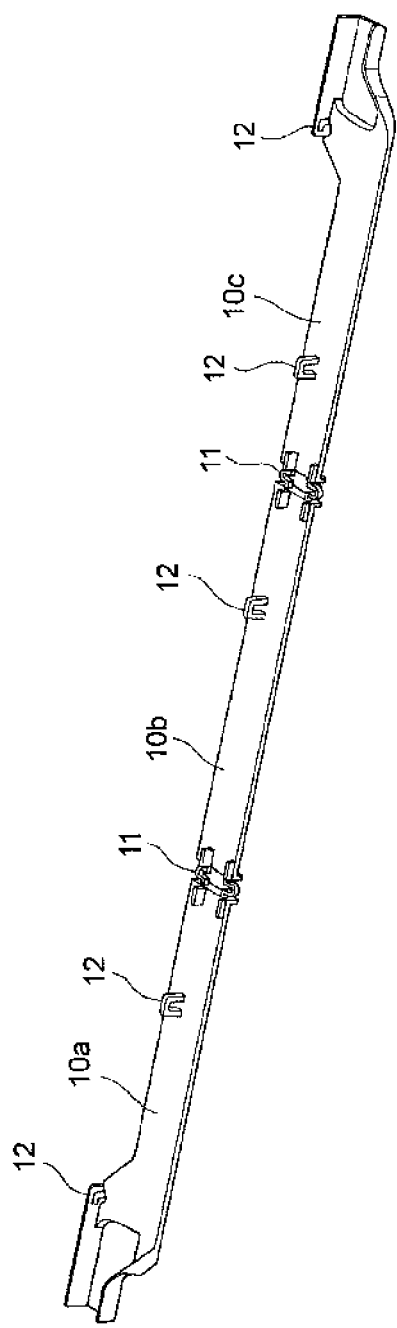
FIG. 2 is a perspective view showing inner surface sides of insulating covers of the bus bar module of FIG. 1.

A bus bar module according to an embodiment of the present invention will be described below with reference to the accompanying drawings. A bus bar module 1 of the embodiment of the present invention is attached to positive and negative columnar electrodes projecting from a top portion of a battery assembly (not shown), for example. In the battery assembly, positive electrodes and negative electrodes of battery cells are alternately arranged. A positive electrode of a battery cell and a negative electrode of an adjacent battery cell are connected to each other with a conductor plate called a bus bar. Thus, the multiple battery cells are connected in series. The positive electrode and the negative electrode of each battery cell in the battery assembly are located in a direction orthogonal to the arrangement direction. In other words, the electrodes of the battery cells are arranged in two rows in the arrangement direction. Accordingly, the bus bar module 1 includes two rows of bus bar case assemblies 2a and 2b located parallel to the arrangement direction of the battery assembly. Each of the bus bar case assemblies 2a and 2b includes multiple bus bar cases 3 made of a resin, each of which is configured to house the corresponding bus bar. Each two adjacent bus bar cases 3 are connected to each other with a flexible connecting member (a first connecting member) 4. The bus bar case assemblies 2a and 2b are formed substantially into the same structure except for the respective end portions. Given this fact, the bus bar module of the embodiment will be described by using the bus bar case assembly 2a shown in FIG. 1 as an example. Note that the bus bar case assembly 2a and the bus bar case assembly 2b are formed symmetrically with respect to the arrangement axis of the battery assembly.

Figure 4B:
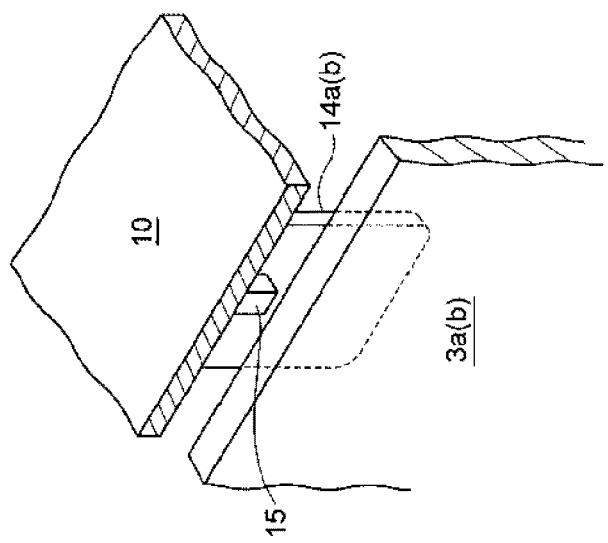
FIGS. 4A and 4B are views of the ribs of FIG. 3, which are viewed from the line IV-IV in FIG. 3.
Figure 4A:
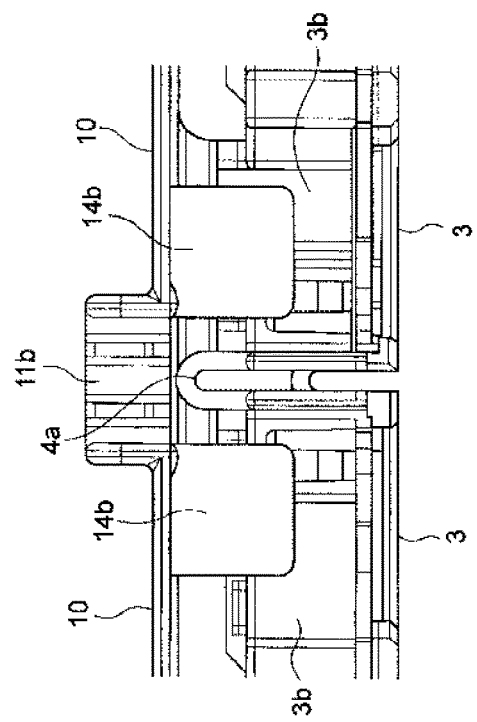

The bus bar case assembly 2a includes the multiple bus bar cases 3, and the connecting members 4 each of which connects an adjacent pair of the bus bar cases 3. The connecting members 4 are flexible. As shown in FIG. 4A, each connecting member 4 is formed integrally with two ends of the adjacent bus bar cases 3. The connecting member 4 includes a strip-shaped portion 4a formed into an inverted U-shape. The strip-shaped portion 4a protrudes to an upper end side of the bus bar cases 3. However, the shape of the connecting members 4 is not limited only to this example. The connecting members 4 may adopt various structures (shapes) as long as the structures can establish the connection with such a strength that the adjacent bus bar cases 3 can change their relative positions to each other. Meanwhile, the bus bar cases 3 are provided with wire routing paths 5 located on the near side in FIG. 1. The wire routing paths 5 house wires for detecting voltages of the battery cells. The wire routing paths 5 are formed integrally with the respective bus bar cases 3. Each wire routing path 5 is provided with a lid 6 which is made openable and closable. The lid 6 is connected to a side edge of the corresponding bus bar case 3 with a flexible hinge. The lid 6 is locked to a side surface of the corresponding wire routing path 5 in an attachable and detachable manner using engagement portions 7.

Figure 5A:
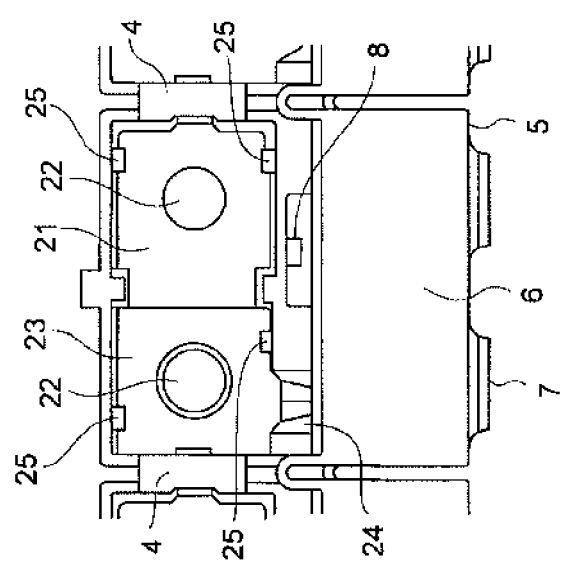
FIGS. 5A and 5B are views for explaining configurations of a lock mechanism for the insulating cover and of a bus bar case.
Figure 5B:
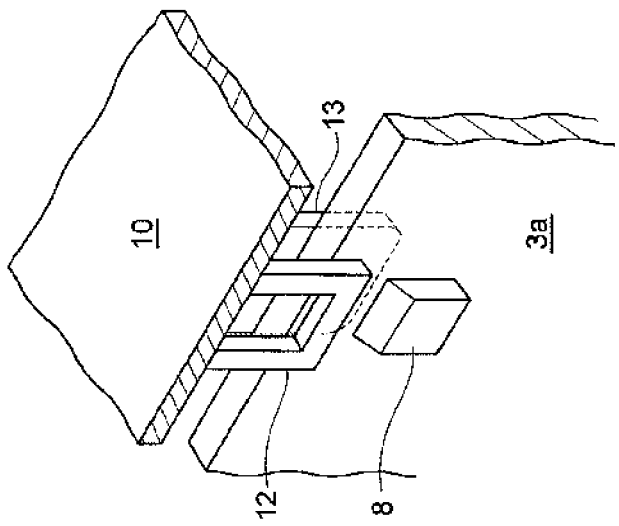

Three insulating covers 10 are provided in this embodiment. In the following description, these insulating covers may be occasionally referred to as insulating covers 10a, 10b, and 10c for the sake of convenience. The insulating covers 10 cover openings of the bus bar cases 3. Each insulating cover 10 of the embodiment is provided to cover a half of the lid 6 of each wire routing path 5. The insulating covers 10 are formed to cover the entirety of the openings of the multiple (four or five in the illustrated example) bus bar cases 3. Each insulating cover 10 is made of an electrically insulative resin. Each two adjacent insulating covers 10 are connected to each other with a flexible connecting member (a second connecting member) 11. Each insulating cover 10 includes at least one second engagement portion 12 serving as a lock unit. Such a second engagement portion 12 is engaged with a corresponding first engagement portion 8 provided on one of the multiple bus bar cases 3. Each of the insulating covers 10a and 10c is provided with two second engagement portions 12 while the insulating cover 10b is provided with one second engagement portion 12. The bus bar cases 3 to be engaged with these second engagement portions 12 are provided with the first engagement portions 8 as shown in FIGS. 5A and 5B, for example. Each second engagement portion 12 has a shape of a hole, a groove, or the like into which the corresponding first engagement portion 8 is fitted. As shown in FIG. 5B, for instance, the second engagement portion 12 is formed into a shape of a flat plate-shaped and hollow frame. As shown in FIG. 5B, each first engagement portion 8 is provided to protrude outward from a side wall 9 of the bus bar case 3. The first engagement portion 8 is formed into a shape of a claw, for example. The first engagement portions 8 are provided on the bus bar cases 3 at positions corresponding to the insulating covers 10a, 10b, and 10c. Moreover, when the insulating covers 10a, 10b, and 10c cover the openings of the bus bar cases 3, the claws of the first engagement portions 8 on the bus bar cases 3 are engaged with beams of the second engagement portions 12 on the insulating covers 10, whereby the insulating covers 10 are locked to the bus bar cases 3. Here, the first engagement portion 8 and the second engagement portion 12 are apt to be unlocked if engagement therebetween is inadequate. Hence, the insulating covers 10 may be provided with ribs 13 as shown in FIG. 5B. Each rib 13 is provided facing the corresponding second engagement portion 12 in such a way that the engagement portion 8 on the bus bar case 3 is nipped between the rib 13 and the second engagement portion 12. Thus, the first engagement portion 8 and the second engagement portion 12 become less likely to be unlocked.

Figure 3:
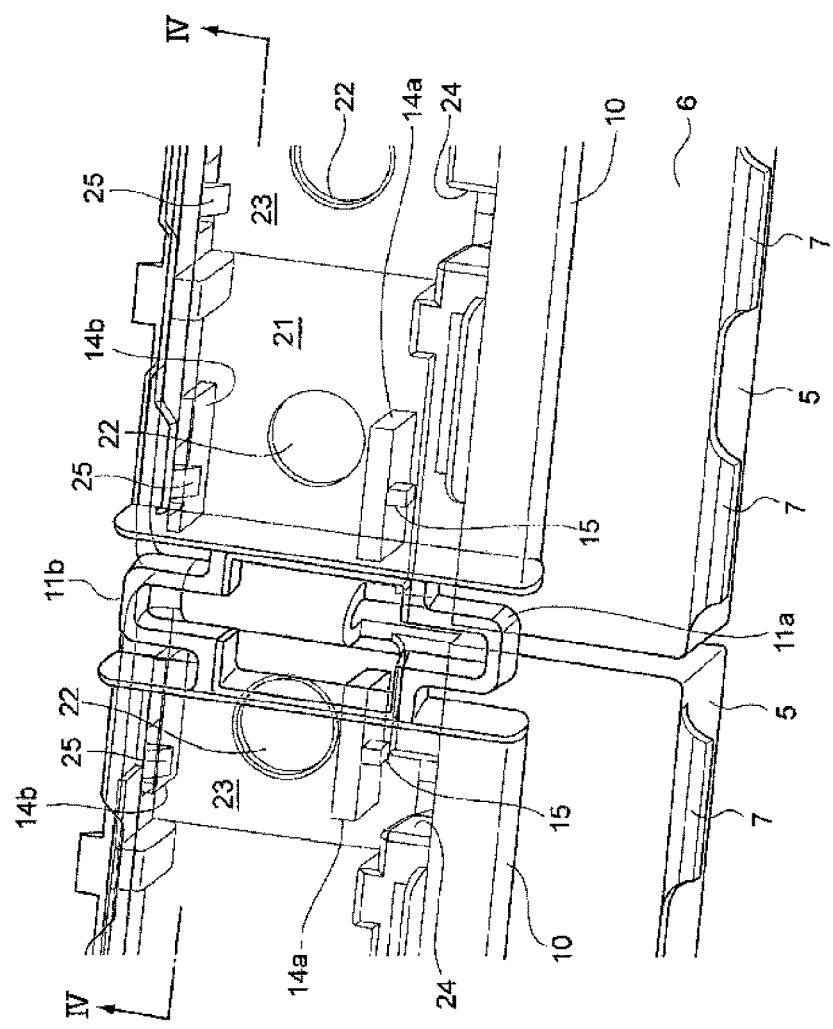
FIG. 3 is a transparent view showing ribs provided to the insulating covers according to the embodiment of the present invention.

FIG. 3 is a transparent view illustrating a state where the openings of the bus bar cases 3 are covered with the insulating covers 10, which is viewed from an outer surface side of the insulating covers 10. As shown in FIG. 3, the adjacent insulating covers 10 (10a and 10b, for example) are connected to each other with the flexible connecting member 11. The connecting member 11 includes strip-shaped portions 11a and 11b, which are formed into U-shaped portions facing each other and are located between outer surfaces of opposed cover walls of the adjacent insulating covers 10.

Each of the bus bar cases 3 includes a pair of walls 3a and 3b which extend in the arrangement direction of the bus bar cases 3 and face each other. In other words, the walls 3a and the walls 3b are provided in the arrangement direction of the bus bar cases 3, respectively. Each bus bar 21 is placed between the corresponding pair of walls 3a and 3b. As shown in FIG. 4A, a pair of ribs 14a and 14b are provided on inner surfaces of the insulating covers 10 (10a and 10b, for example) that are adjacent to each other while interposing the connecting member 11 in between, and at positions of the aforementioned inner surfaces in contact with inner surfaces of the pair of walls 3a and 3b. Each of the ribs 14a and 14b is formed into a flat plate shape, and extends downward from the inner surface of the corresponding insulating cover 10 to the bus bar 21 (or a terminal 23). Meanwhile, each pair of ribs 14a and 14b are provided at the positions close to the connecting member 11 for connecting the adjacent insulating covers 10. In other words, each pair of ribs 14a and 14b are provided at end portions of the corresponding insulating cover 10 to be connected to the connecting member 11. Moreover, as shown in FIG. 4B, each of the ribs 14a and 14b includes a reinforcing rib 15, which projects perpendicularly from a surface of the rib (a surface facing the wall 3a (3b)). The reinforcing rib 15 extends from the inner surface of the insulating cover 10 toward a top portion of the wall 3*a* (3*b*) of the bus bar case 3. The reinforcing rib 15 has such a length that the reinforcing rib 15 can be out of contact with the top portion of the wall 3*a* (3*b*). Here, claws 25 for holding the bus bar 21 at a predetermined position are provided on inner surfaces of the bus bar case 3.

Procedures for assembling the bus bar module 1 will be briefly described. First, the bus bar case assemblies 2*a* and 2*b* integrally provided with the wire routing paths 5 are attached to the columnar electrodes (not shown) of the battery assembly. At this time, the columnar electrodes of the adjacent battery cells are positioned and inserted respectively into two holes 22 provided in each bus bar 21 shown in FIG. 5A. Moreover, a voltage detection terminal 23 is brought in through a slit 24 provided in the wall 3*a* of each bus bar case 3, and is attached to the columnar electrode that is inserted into one of the holes 22. The terminal 23 is connected to a voltage detection wire which is routed in the wire routing paths 5. Then, the bus bars 21 and the terminals 23 are connected to the battery cells by screwing nuts onto threads on the columnar electrodes. Subsequently, the second engagement portions 12 of the insulating covers 10 are aligned with the first engagement portions 8 of the corresponding bus bar cases 3. Thereafter, the insulating covers 10 are attached and locked to the opening surfaces of the bus bar cases 3 sequentially from one end side of the bus bar module 1, for example. At this time, the pair of ribs 14*a* and 14*b* provided on the inner surface of the given insulating cover 10 are positioned to come into contact with the inner surfaces of the walls 3*a* and 3*b* of the corresponding bus bar case 3. Then, the insulating cover 10 is pushed into the bus bar case 3. Thus, the first and second engagement portions 8 and 12 are engaged with and locked to each other.

According to the embodiment of the present invention, even if the first and second engagement portions 8 and 12 as a lock mechanism for at least one of two adjacent insulating covers 10 are unlocked in the course of assembling the bus bar module 1, the pair of ribs 14*a* and 14*b* provided on the inner surface of the relevant insulating cover 10 remain in contact with the corresponding bus bar case 3. As a consequence, a relative position between the insulating cover 10 and the bus bar cases 3 is not displaced unless the insulating cover 10 is pulled up to a position where the pairs of ribs 14*a* and 14*b* are detached from the bus bar cases 3. Thus, it is possible to prevent exposure of the columnar electrodes and the bus bars in the bus bar cases 3.

In other words, if at least one of the lock mechanisms for two adjacent insulating covers 10 and the corresponding bus bar cases 3 is unlocked, the unlocked insulating cover 10, without the pairs of the ribs 14*a* and 14*b* provided, is apt to be displaced relative to the opening surfaces of the bus bar cases 3 due to a deformation of the connecting member 11. If such displacement is significant, the columnar electrodes and bus bars in the bus bar cases 3 are exposed. The exposure of the columnar electrodes and the bus bars, to which a battery voltage is being applied, disturbs attachment work of the bus bar module. On the other hand, according to the embodiment, it is possible to avoid exposure of the columnar electrodes and the bus bars, to which the battery voltage is being applied, by restricting relative displacement between the insulating covers 10 and the opening surfaces of the bus bar cases 3. In particular, according to the embodiment, each pair of ribs 14*a* and 14*b* are provided in the vicinity of the corresponding connecting member 11 where the displacement of the insulating cover 10 reaches a maximum. Thus, the relative displacement of the insulating cover 10 from the opening surfaces of the bus bar cases 3 can be reduced. In addition, the reinforcing ribs 15 are provided so as to reinforce the pairs of the ribs 14*a* and 14*b*. As a consequence, the pairs of ribs 14*a* and 14*b* can be made thin.

Although the present invention has been described on the basis of a certain embodiment, it is obvious to those skilled in the art that the invention is not limited only to the above-described embodiment but can also be embodied in various other modes that are modified or changed within the scope of the gist of the present invention. It should be naturally understood that such modified or changed modes are also encompassed by the scope of the appended claims.

What is claimed is:

1. A bus bar module comprising:
   a plurality of bus bar cases made of a resin, each bus bar case configured to house a bus bar to connect a positive electrode of a battery cell and a negative electrode of an adjacent battery cell among battery cells arrayed such that the positive electrodes and the negative electrodes of the battery cells are arranged alternately;
   a first engagement portion provided to one of the plurality of bus bar cases;
   a first connecting member having flexibility and configured to connect the plurality of bus bar cases;
   a plurality of insulating covers made of a resin, the insulating covers configured to cover openings of the plurality of bus bar cases and including a second engagement portion to be engaged with the first engagement portion;
   a second connecting member having flexibility and configured to connect the plurality of insulating covers; and
   a pair of first ribs provided to extend downward from an inner surface of each of the insulating covers located adjacent to each other while interposing the second connecting member in between, the pair of first ribs configured to be in contact respectively with inner surfaces of paired walls of the corresponding bus bar case, the walls extending in a direction of arrangement of the bus bar cases and facing each other, wherein
   the insulating covers are provided with a second rib facing the second engagement portion in such a manner that the first engagement portion on the bus bar case is nipped between the second rib and the second engagement portion.

2. The bus bar module according to claim 1, wherein each of the first pair of ribs is provided at a position in the insulating cover close to the second connecting member.

3. The bus bar module according to claim 1, wherein each of the first pair of ribs includes a reinforcing rib extending from the inner surface of the insulating cover toward a top portion of the corresponding wall of the bus bar case, and having such a length that the reinforcing rib is out of contact with the top portion.

* * * * *